US011315193B1

(12) United States Patent
Kim

(10) Patent No.: US 11,315,193 B1
(45) Date of Patent: Apr. 26, 2022

(54) SYSTEMS AND METHODS FOR IMPLEMENTING A DECENTRALIZED INSURANCE PLATFORM USING SMART CONTRACTS AND MULTIPLE DATA SOURCES

(71) Applicant: BlueOwl, LLC, San Francisco, CA (US)

(72) Inventor: Michael Sungjun Kim, Fairfax, VA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 16/788,757

(22) Filed: Feb. 12, 2020

(51) Int. Cl.
*G06Q 40/08* (2012.01)
*G06Q 10/10* (2012.01)
*G06Q 20/10* (2012.01)
*G06Q 30/06* (2012.01)
*G06Q 20/06* (2012.01)
(Continued)

(52) U.S. Cl.
CPC ......... *G06Q 40/08* (2013.01); *G06F 16/2365* (2019.01); *G06Q 10/10* (2013.01); *G06Q 20/0655* (2013.01); *G06Q 20/108* (2013.01); *G06Q 20/3678* (2013.01); *G06Q 30/0613* (2013.01); *G06Q 30/0641* (2013.01); *G06Q 2220/00* (2013.01)

(58) Field of Classification Search
CPC ...... G06Q 40/04; G06Q 10/10; G06Q 20/108; G06Q 20/3678; G06Q 30/0613; G06Q 30/0641; G06Q 2220/00
USPC ...................................................... 705/3–44
See application file for complete search history.

(56) References Cited

U.S. PATENT DOCUMENTS

| 8,478,633 | B2 * | 7/2013 | Chang | G06Q 10/06375 |
| | | | | 705/7.38 |
| 10,346,406 | B2 * | 7/2019 | Booz | H04W 12/10 |
| 10,497,037 | B2 * | 12/2019 | Isaacson | G06Q 20/12 |

(Continued)

OTHER PUBLICATIONS

Riki Fuji-Rajani, "FinTech developments in banking, insurance and FMIs", Reserve Bank of New Zealand, Bulletin Vo. 81, No. 12, Nov. 2018.*

(Continued)

*Primary Examiner* — Frantzy Poinvil
(74) *Attorney, Agent, or Firm* — Faegre Drinker Biddle & Reath LLP

(57) ABSTRACT

A smart contract computing device may be provided. A processor may be configured to: (1) receive a plurality of deposits from a plurality of user computing devices; (2) store the plurality of deposits in a blockchain structure including, for each user computing device, a user identifier and a current amount; (3) receive, from at least one user computing device of the plurality of user computing devices, a proposal message for a decentralized insurance policy, the proposal message including a price amount, a coverage amount, a payout condition, and a specified data source; (4) receive, from at least one user computing device of the plurality of user computing devices, a response message for the decentralized insurance policy; and/or (5) generate, in response to receiving the response message, a smart contract in the blockchain structure including at least one buyer user identifier, at least one seller user identifier, the coverage amount, the payout condition, and the specified data source.

18 Claims, 8 Drawing Sheets

(51) Int. Cl.
  *G06Q 20/36* (2012.01)
  *G06F 16/23* (2019.01)

(56) References Cited

U.S. PATENT DOCUMENTS

| | | | |
|---|---|---|---|
| 10,535,111 B2* | 1/2020 | O'Brien | G07F 17/3244 |
| 10,721,274 B1* | 7/2020 | Prasad | H04L 41/142 |
| 10,789,590 B2* | 9/2020 | Tran | G06Q 20/382 |
| 2016/0203448 A1* | 7/2016 | Metnick | H04L 9/3247 705/64 |
| 2017/0372300 A1* | 12/2017 | Dunlevy | G06Q 20/36 |
| 2018/0025435 A1* | 1/2018 | Karame | H04L 9/3236 705/30 |
| 2018/0089758 A1 | 3/2018 | Stradling et al. | |
| 2018/0218176 A1 | 8/2018 | Voorhees et al. | |
| 2018/0218455 A1 | 8/2018 | Kolb et al. | |
| 2019/0080392 A1* | 3/2019 | Youb | G06F 21/64 |
| 2019/0102850 A1 | 4/2019 | Wheeler et al. | |
| 2019/0122300 A1* | 4/2019 | O'Brien | G07F 17/3286 |
| 2019/0147438 A1* | 5/2019 | Micali | H04L 9/3255 705/71 |
| 2019/0236559 A1* | 8/2019 | Padmanabhan | G06F 21/64 |
| 2019/0385172 A1* | 12/2019 | Jayaram | G06Q 20/405 |
| 2020/0074552 A1* | 3/2020 | Shier | G06Q 20/10 |
| 2020/0313884 A1* | 10/2020 | Trevethan | G06Q 10/10 |
| 2020/0394183 A1* | 12/2020 | Jois | G06F 16/9024 |

OTHER PUBLICATIONS

Smith, Kate, "Blockchain reaction: blockchain technology is poised to remake insurance transactions with surprising impacts", Best's Review 117.7:62(5). A.M. Best Company, Inc. November. (Year: 2016).*

A Decentralized Insurance and Reinsurance Marketplace, by Stephan Karpischek et al., Etherise, dated Dec. 21, 2016, 40 pages.

A Peer-to-Peer Discretionary Mutual on the Ethereum Blockchain, by Hugh Karp et al., Nexus Mutual, 16 pages.

* cited by examiner

SYSTEMS AND METHODS FOR IMPLEMENTING A DECENTRALIZED INSURANCE PLATFORM USING SMART CONTRACTS AND MULTIPLE DATA SOURCES

FIELD OF THE DISCLOSURE

The present disclosure relates to blockchain-based smart contracts, and more particularly, to systems and methods for implementing a decentralized insurance platform based at least in part upon smart contracts and multiple data sources.

BACKGROUND

Blockchain and cryptocurrencies are increasingly being used in many different contexts. A cryptocurrency is a digital asset designed to work as a medium of exchange (e.g., money) that uses cryptography to secure financial transactions, control the creation of additional units, and/or verify the transfer of assets. Examples of cryptocurrencies include Bitcoin, Ether, and various others (e.g. "Altcoins"). Blockchain is a data structure that includes a growing list of records (e.g., "blocks") that are linked using cryptography. Among other uses, blockchain is used to record cryptocurrency transactions, for example, to provide validity for a cryptocurrency's units (e.g., "coins"). The versatility and wide accessibility of blockchain and cryptocurrencies has led to their adoption in a variety of different contexts.

However, blockchain and cryptocurrencies are generally not used in certain insurance contexts, such as decentralized insurance. Decentralized insurance products are types of insurance coverage offered through an open market rather than through a traditional relationship with an insurance company. Current computing devices generally do not function to automatically facilitate and execute decentralized insurance policies. A computing device capable of implementing a specific blockchain structure for facilitating transactions such as decentralized insurance policies is therefore desirable.

BRIEF SUMMARY

The present embodiments may relate to, inter alia, systems and methods for implementing decentralized insurance using smart contracts and multiple data sources. A blockchain structure (e.g., Ethereum) may include smart contracts that automatically cause funds (e.g., cryptocurrency) to be transferred from one user to another upon the occurrence of a certain payout condition. One or more specified data sources (e.g., government or non-government agencies, news entities, and/or other publishing entities) may be used to automatically determine whether the payout condition has occurred. Users may deposit funds that are stored in the blockchain structure to be used, for example, to pay for and/or provide coverage for a decentralized insurance policy. Users may interact with the system via a marketplace interface that enables users, for example, to propose decentralized insurance policies to other users, purchase decentralized insurance policies, and/or provide insurance coverage to other users. When one user (a "buyer") purchases an insurance policy from another user (a "seller"), a price amount may be transferred from the buyer to the seller within the blockchain structure, and a smart contract corresponding to the decentralized insurance policy may be stored in the blockchain structure. If the system determines, based at least in part upon one or more data sources specified in the contract, that a specified payout condition has occurred, a coverage amount may automatically be transferred to the buyer within the blockchain structure. The buyer may then withdraw the payout, for example, as an electronic payment (e.g., a cryptocurrency payment).

In one aspect, smart contract (SC) computing device may be provided. The SC computing device may include at least one processor in communication with at least one memory device. The at least one processor may be configured to: (1) receive a plurality of deposits from a plurality of user computing devices; (2) store the plurality of deposits in a blockchain structure including, for each computing device of the user computing devices, a user identifier and a current amount; (3) receive, from at least one user computing device of the plurality of user computing devices, a proposal message for a decentralized insurance policy, the proposal message including a price amount, a coverage amount, a payout condition, and a specified data source; (4) receive, from at least one user computing device of the plurality of user computing devices, a response message for the decentralized insurance policy; and/or (5) generate, in response to receiving the response message, a smart contract in the blockchain structure including at least one buyer user identifier, at least one seller user identifier, the coverage amount, the payout condition, and the specified data source. The SC computing device may include additional, less, or alternate functionality, including that discussed elsewhere herein.

In another aspect, a computer-implemented method for smart contracts may be provided. The computer-implemented method may be performed by a smart contract (SC) computing device including at least processor in communication with at least one memory device. The computer-implemented method may include: (1) receiving, by the SC computing device, a plurality of deposits from a plurality of user computing devices; (2) storing, by the SC computing device, the deposits in a blockchain structure including, for each computing device of the user computing devices, a user identifier and a current amount; (3) receiving, by the SC computing device, from at least one user computing device of the plurality of user computing devices, a proposal message for a decentralized insurance policy, the proposal message including a price amount, a coverage amount, a payout condition, and a specified data source; (4) receiving, by the SC computing device, from at least one user computing device of the plurality of user computing devices, a response message for the decentralized insurance policy; and/or (5) generating, by the SC computing device, in response to receiving the response message, a smart contract in the blockchain structure including at least one buyer user identifier, at least one seller user identifier, the coverage amount, the payout condition, and the specified data source. The computer-implemented method may include additional, less, or alternate actions, including those discussed elsewhere herein.

In another aspect, at least one non-transitory computer-readable media having computer-executable instructions embodied thereon may be provided. When performed by a smart contract (SC) computing device including at least one processor in communication with at least one memory device, the computer-executable instructions may cause the at least one processor to (1) receive, a plurality of deposits from a plurality of user computing devices; (2) store the plurality of deposits in a blockchain structure including, for each computing device of the user computing devices, a user identifier and a current amount; (3) receive, from at least one user computing device of the plurality of user computing devices, a proposal message for a decentralized insurance policy, the proposal message including a price amount, a coverage amount, a payout condition, and a specified data source; (4) receive, from at least one user computing device of the plurality of user computing devices, a response message for the decentralized insurance policy; and/or (5) generate, in response to receiving the response message, a smart contract in the blockchain structure including at least one buyer user identifier, at least one seller user identifier, the coverage amount, the payout condition, and the specified data source. The computer-executable instructions may direct additional, less, or alternate functionality, including that discussed elsewhere herein.

Depending upon embodiment, one or more benefits may be achieved. These benefits and various additional objects, features and advantages of the present invention can be fully appreciated with reference to the detailed description and accompanying drawings that follow.

Figure 1:
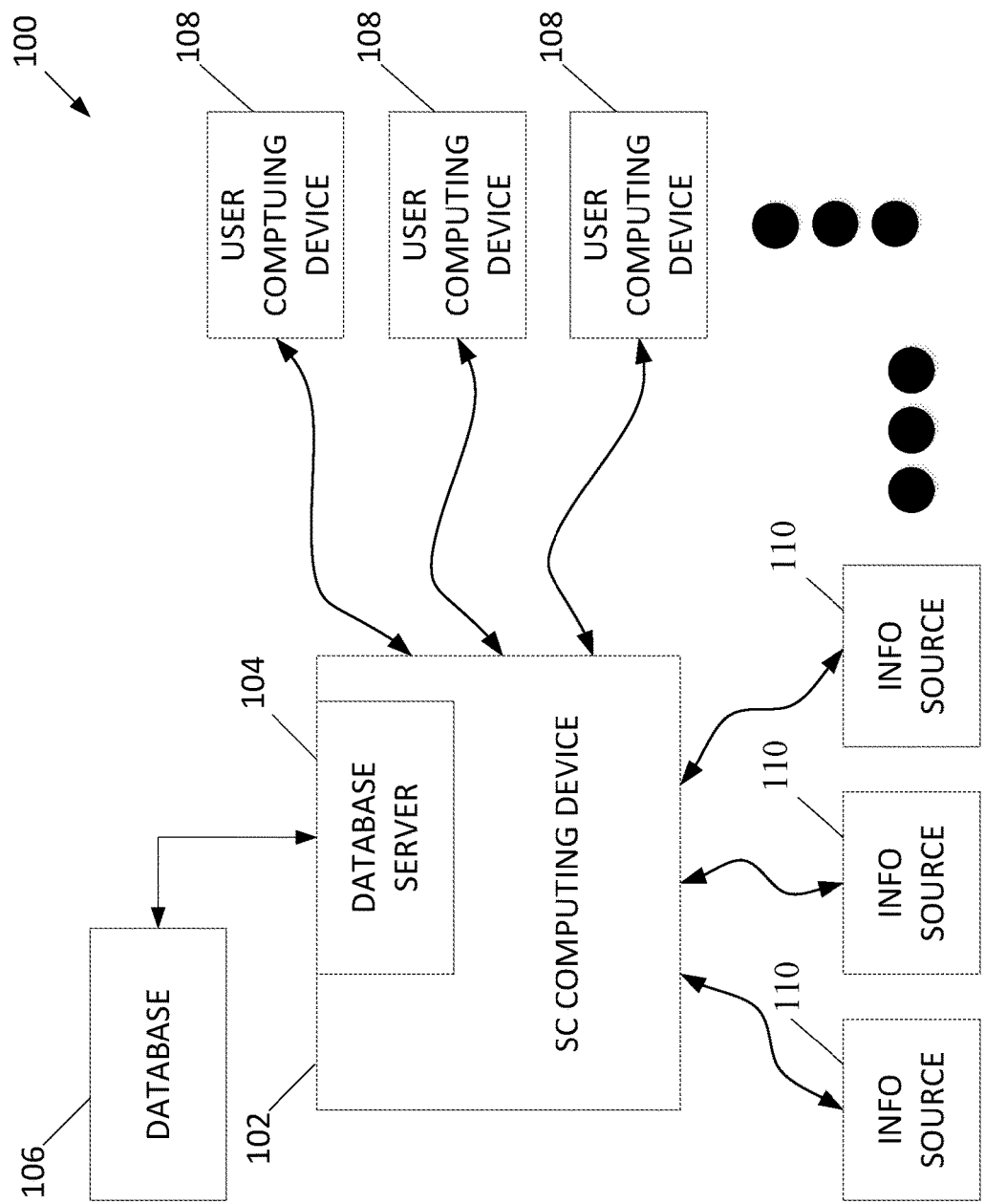
FIG. 1 depicts an exemplary smart contract (SC) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the disclosure.

DETAILED DESCRIPTION OF THE DRAWINGS

The present embodiments may relate to, inter alia, systems and methods for implementing decentralized insurance using smart contracts and multiple data sources. A smart contract may be a computer protocol configured to digitally facilitate, verify, and/or enforce negotiation and/or performance of a contract (e.g., a decentralized insurance contract), and may be implemented using a blockchain structure (e.g., Ethereum). The blockchain structure may include smart contracts that automatically cause funds (e.g., cryptocurrency) to be transferred from one user to another upon the occurrence of a certain payout condition. One or more specified data sources (e.g., government or non-government agencies, news entities, and/or other publishing entities) may be used to automatically determine whether the payout condition has occurred. For example, the payout condition may be that a certain amount of precipitation occurs at a certain location in a specified month, and the specified data source may be the United States National Weather Service. The system may include a database where data from many different sources is stored in a standardized format. In some embodiments, some aspects of the systems and methods may be performed by a smart contract (SC) computing device that is described herein.

The systems and method may enable users to deposit funds (e.g., as an electronic and/or cryptocurrency payment). The deposited funds may be stored in the blockchain structure in association with user identifiers corresponding to each user. For example, the funds may be stored in a deposits tree that tracks a current amount of funds associated with each user. The deposited funds may be used, for example, to pay for and/or provide coverage for a decentralized insurance policy.

In some embodiments, the systems and methods may facilitate a marketplace for decentralized insurance policies. Users may interact with the system via a marketplace interface that enables users, for example, to propose decentralized insurance policies to other users, purchase decentralized insurance policies, and/or provide insurance coverage to other users. When one user (a "buyer") purchases an insurance policy from another user (a "seller"), a price amount may be transferred from the buyer to the seller within the blockchain structure, and a smart contract corresponding to the decentralized insurance policy may be stored in the blockchain structure. If the payout condition occurs, the coverage amount may be automatically transferred to the buyer. In some examples, a single seller (e.g., an insurance company) may agree to pay the entire coverage amount if the payout condition occurs. In alternative examples, a plurality of sellers (e.g., individual investors) may agree to pay a portion of the coverage amount if the payout condition occurs in exchange for a portion of the price paid by the seller, such that the coverage obligation is decentralized among each of the plurality of sellers. In some embodiments, machine learning techniques and/or artificial intelligence (AI) may be used, for example, to generate recommendations of distributed insurance policies for users and/or for combining similar decentralized insurance policies.

In some embodiments, if the system determines, based at least in part upon one or more data sources specified in the contract, that a specified payout condition has occurred, the coverage amount may automatically be transferred from the one or more sellers to the buyer within the blockchain structure. The buyer may then withdraw the payout, for example, as an electronic payment (e.g., a cryptocurrency payment), and/or may use the payout for further transactions within the system (e.g., additional insurance purchases).

Examples of Receiving and Storing Deposits in a Blockchain Structure

In one exemplary embodiment, the SC computing device may be configured to receive a plurality of deposits from a plurality of user computer devices corresponding to a plurality of users. In some embodiments, the deposits are in the form of a cryptocurrency (e.g., Bitcoin, Ether, and/or other cryptocurrencies) and/or another electronic funds transfer protocol. The SC computing device may store the received funds in a blockchain structure. In some embodiments, the deposit received for a given user may be stored in association with a corresponding user identifier. The SC computing device may further enable funds to be withdrawn and/or transferred among users.

In some embodiments, the blockchain structure may include a deposits tree that tracks a current amount of funds associated with each user identifier. For example, the deposits tree may include a plurality of nodes. Each node may include each of the user identifiers corresponding to the plurality of users and the current amount of funds associated with each user. A new node may be added each time an amount of funds for a particular user identifier changes, for example, via a deposit, withdrawal, or transfer to another user identifier. For example, if a first user transfers funds to a second user, a new node may be generated, wherein the current amount of funds associated with the user identifier of the first user is reduced by the payment amount, and the current amount of funds associated with the second user is increased by the payment amount. The newly generated node may include a data feature (e.g., a cryptographic hash) linking the newly generated node, for example, to the chronologically previous node.

In some embodiments, the SC computing device may further enable users to withdraw funds from the blockchain structure. For example, a user may withdraw funds after receiving a payout from a smart contract, as described below. In some embodiments, the SC computing device may place conditions on when a user may withdraw funds. For example, if a user has committed a certain amount of funds (e.g., an insurance coverage amount) for a period under a smart contract, as described below, the SC computing device may prevent the user from withdrawing funds if the withdrawal could cause the current amount of funds of the user to fall below the committed amount.

Examples of Receiving Proposals and Implementing a Marketplace

In one exemplary embodiment, the SC computing device may receive, from one of the plurality of users, a proposal message for a proposed smart contract between users. The proposal message may include, for example, proposed terms for the smart contract. For example, the proposed smart contract may be a decentralized insurance policy, and the proposed terms may include, for example, a price, a coverage amount, a payout condition of the coverage amount, and/or a specified data source. The price is an amount of funds to be paid by the buyer of the decentralized insurance policy. The coverage amount is an amount to be paid by the seller to the buyer if the payout condition occurs, for example, before a set term has expired. The specified data source may include one or more data sources that are used to determine whether the payout condition has occurred. In one example, the payout condition may be that an earthquake registering above 7.4 on the Richter scale occurs in San Francisco in a given year, and the specified data source may be the United States Geological Survey (USGS). In another example, the payout condition may be that an air quality index reaches above hazardous levels of 301 parts per million for more than one week in San Francisco, and the specified data source may be the United States Environmental Protection Agency (EPA). In some examples, the smart contract may include any number of payout conditions, and each payout condition may have any number of data sources that are used to verify whether the payout condition has occurred. For example, the SC computing device may compute an average value from values obtained from different data sources corresponding to the same parameter.

In some embodiments, the SC computing device may provide a marketplace to the plurality of user computing devices. The marketplace may include an interface through which the users may, for example, deposit funds, submit proposal messages, and/or further interact with the SC computing device or other users. For example, the marketplace may provide options (e.g., via a pull-down list and/or another virtual mechanism) for a user attempting to submit a proposal, for example, for specific payout conditions (e.g., types of insurance coverage), data sources, periods, and/or other terms of the proposed smart contract. The SC computing device may generate the proposal message based at least in part upon the options selected by the user via the interface. Such an interface enables users to easily and efficiently submit proposals for a smart contract, and ensures that the smart contract has well-defined and/or easily enforceable terms. The SC computing device may display the proposal message to other users via the interface. In some embodiments, the SC computing device may identify other users who are likely to accept the proposed smart contract, for example, using machine learning techniques and/or artificial intelligence (AI) techniques, and display the proposal message to the identified users.

In the exemplary embodiment, the SC computing device may receive response messages from users, for example, to join the proposed smart contract. When the proposed smart contract corresponds to a decentralized insurance policy, the response messages may include at least one response message from a buyer and/or from a seller of the policy. In some examples, the user who submitted the proposal message for the smart contract may additionally be a buyer or seller with respect to the smart contract. For example, an insurance company may submit a proposal for a decentralized insurance policy and be the "seller" of the policy with respect to the proposed smart contract, and one or more buyers (e.g., potential customers) may submit the response message. In some examples, the response message may be submitted via the interface provided by the SC computing device.

In some example embodiments, a plurality of buyers and/or a plurality of sellers may respond to a particular smart contract. For example, a decentralized insurance policy may have a coverage amount that is significantly greater than the price, making the decentralized insurance policy risky for an individual seller who may potentially have to pay the entire coverage amount. By enabling a plurality of sellers to respond, the SC computing device allows the obligation to pay the coverage amount if the payout condition occurs to be spread out over the plurality of sellers. In some embodiments, the SC computing device may identify similar or otherwise combinable proposals, for example, using machine learning techniques and/or AI techniques, and aggregate the identified proposals.

Examples of Generating and Executing Smart Contracts

In one exemplary embodiment, the SC computing device may generate a smart contract in the blockchain structure, for example, in response to receiving response messages accepting a proposed smart contract. In some embodiments, the SC computing device generates the smart contracts using an open-source platform (e.g., Ethereum). The SC computing device may store the contracts in a contract tree within the blockchain structure, which may be separate from the deposits tree. For example, each smart contract may be a node (e.g., a "block") of the contract tree. Each smart contract may include data (e.g., user identifiers, the coverage amount, the payout condition, the selected data source, and/or other data), other computer code for executing the smart contract, and/or one or more data features (e.g., a cryptographic hash) linking the smart contract to other nodes of the contract tree (e.g., a chronologically previous node).

In the exemplary embodiments, the SC computing device may determine whether the one or more payout conditions of a smart contract have occurred and/or otherwise has been met. The SC computing device may determine whether the payout condition has occurred based at least in part upon one or more data sources. The data sources may include, for example, government or non-government organizations, news entities, and/or other entities producing publications.

In some embodiments, data from the various data sources may be collected by the SC computing device and stored in a database. In such embodiments, the data may be stored in a specific, standardized format. For example, data may be organized by source, type, time recorded and/or updated, other attributes, and/or any combination thereof. In one example, the database may include a plurality of data fields and a plurality of real data values associated with each data field, wherein the real data values are received from the data sources. When determining whether the payout condition for a smart contract has been met, the SC computing device may retrieve a corresponding real data value from the database to compare to a value (sometimes referred to herein as a "condition value") specified by the smart contract.

For example, in some embodiments, to determine whether the payout condition has occurred, the SC computing device may extract a condition value from the smart contract. For example, the condition value may include a precipitation amount at a specified location and an indicator of whether the payout condition needs that the precipitation be greater or less than the precipitation amount. The SC computing device may then retrieve, from the database, the real data value corresponding to the payout condition, wherein the real data value originates from a data source specified by the contract. For example, the SC computing device may retrieve data from a data source (e.g., the National Weather Service) corresponding to the actual precipitation amount at the specified location. The SC computing device may then compare the condition value to the real data value to determine that the payout condition has been met. For example, if the actual precipitation amount is less than the precipitation amount specified in the smart contract, the payout condition may be met, and the buyer may be entitled to receive a payout of the coverage amount. If the SC computing device determines that the payout condition has occurred, the SC computing device may automatically transfer the coverage amount from the buyer to the seller. In some embodiments, the smart contracts stored in the blockchain structure may include instructions (e.g., computer code) that automatically causes the SC computing device to determine whether the payout condition has occurred and/or transfer funds between different users (e.g., a coverage payout to a buyer).

In some embodiments, the SC computing device may use multiple information sources to determine that a particular payout condition has occurred. Using multiple information sources may, for example, mitigate data corruption, data noise, and adversarial attacks against data sources. The SC computing device may use a mechanism and/or algorithm to combine data values obtained from multiple sources into a single real data value that can be compared to the payout condition. In some embodiments, the SC computing device may determine a mode or most common value, across all sources of truth. Additionally or alternatively, in some embodiments, the SC computing device may compute a median value. For example, the SC computing device may compute a median temperature at a given location and given date and time across various weather stations. In other embodiments, the SC computing device may utilize other algorithms that determine a single real data value from multiple source values.

Examples of Decentralized Insurance Applications of the SC Computing Device

In some embodiments, the SC computing device is used to implement a decentralized insurance system, wherein one or more specified data sources are used to determine whether the coverage amount of a decentralized insurance policy should be paid, and in response, automatically transfer the payment. The SC computing device may receive a proposal message including proposed terms for a decentralized insurance policy from a user. The user submitting the proposal message may be, for example, an insurance company and/or an individual user. In some embodiments, the proposal may be submitted through a marketplace interface provided by the SC computing device. The marketplace interface may provide specific options (e.g., via a pulldown menu) of proposed terms for the decentralized insurance policy (e.g., price amounts, coverage amounts, payout conditions, data sources, term periods, and/or other terms). The received proposal message may be displayed to other users via the marketplace interface, and the other users may submit response messages to join the proposed insurance policy, for example, as a buyer or seller. A buyer may pay a price amount, and may receive a payout of a coverage amount if a specified payout condition occurs. A seller may receive a payment of at least a portion of the price amount paid by the buyer, and may make a payment of at least a portion of the coverage amount if the specified payout condition occurs.

Once the terms and parties of the decentralized insurance policy are determined, the SC computing device may generate a smart contract including information about the decentralized insurance policy and store the generated smart contract in a blockchain structure (e.g., Ethereum). The SC computing device may retrieve information from data sources specified by the smart contract in order to determine if the payout condition for payout has been met, for example, by comparing one or more payout condition values specified by the smart contract to one or more real data values stored in a database. If the payout condition has been met, the SC computing device may automatically transfer the coverage amount to the buyer from one or more sellers in association with the smart contract. Once the payout has been made, the buyer may withdraw the funds from the system, for example, as an electronic and/or cryptocurrency payment.

At least one of the technical problems addressed by this system may include: (i) inability of computing devices to provide and execute smart contracts due to a lack of a specific data structure; (ii) inability of computing devices to automatically execute smart contracts based at least in part upon external data sources; (iii) inefficiency in storing and accessing real data corresponding to smart contracts due to a lack of a common data format; (iv) inefficiency in providing decentralized insurance due to a lack of specific data structure for smart contracts related to decentralized insurance; (v) inefficiency in providing decentralized insurance due to an inability of computing devices to facilitate a marketplace interface for smart contracts; and/or (vii) inability of computing devices to implement cryptocurrency-based smart contracts for decentralized insurance.

A technical effect of the systems and processes described herein may be achieved by performing at least one of the following steps: (i) receiving a plurality of deposits from a plurality of user computing devices; (ii) storing the deposits in a blockchain structure including, for each computing device of the user computing devices, a user identifier and a current amount; (iii) receiving, from at least one user computing device of the plurality of user computing devices, a proposal message for a decentralized insurance policy, the proposal message including a price amount, a coverage amount, a payout condition, and a specified data source; (iv) receiving, from at least one user computing device of the plurality of user computing devices, a response message for the decentralized insurance policy; (v) generating, in response to receiving the response message, a smart contract in the blockchain structure including at least one buyer user identifier, at least one seller user identifier, the coverage amount, the payout condition, and the specified data source; (vi) transferring, within the blockchain structure, in response to generating the smart contract, the price amount from a buyer user identifier corresponding to a buyer to a seller user identifier corresponding to a seller; (vii) determining, based at least in part upon the specified data source, that the payout condition has occurred; and/or (viii) transferring, within the blockchain structure, in response to the determination, the coverage amount from the seller user identifier to the buyer user identifier.

The technical effect achieved by this system may be at least one of: (i) an ability for computing devices to provide and execute smart contracts by providing a specific data structure; (ii) an ability for computing devices to automatically execute smart contracts based at least in part upon external data sources; (iii) increased efficiency in storing and accessing real data corresponding to smart contracts by providing a common data format; (iv) increased efficiency in providing decentralized insurance by providing a specific data structure for smart contracts related to decentralized insurance; (v) increased efficiency in providing decentralized insurance by providing an ability for computing devices to facilitate a marketplace interface for smart contracts; (vii) an ability for computing devices to implement cryptocurrency-based smart contracts for decentralized insurance; and/or (viii) improving reliability of input data for a smart contract by combining values from multiple data sources into a single data value.

Exemplary Smart Contracts Systems

Figure 2:
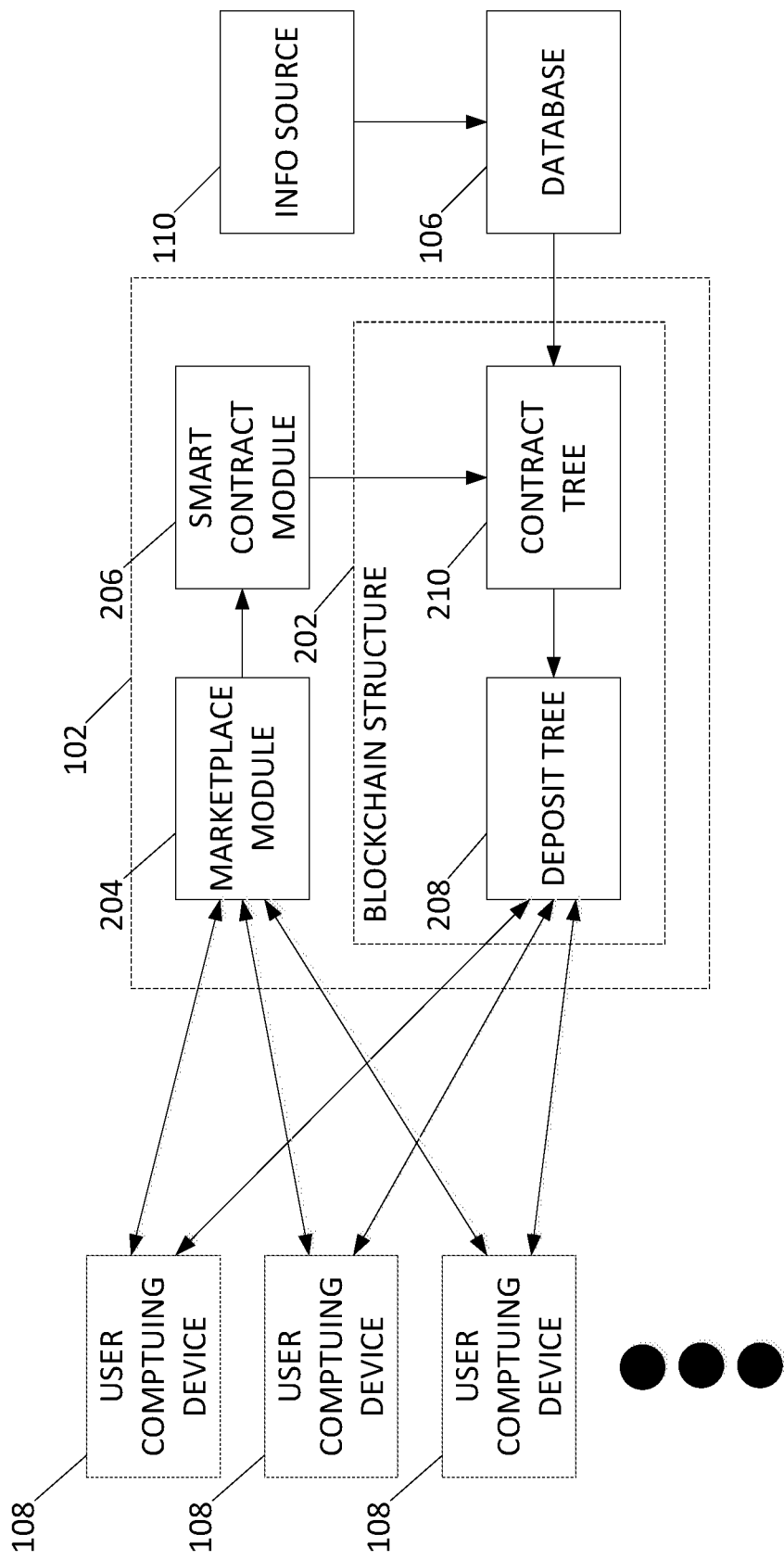
FIG. 2 depicts an exemplary SC computing device that may be used with the SC system illustrated in FIG. 1.

FIG. 1 depicts an exemplary smart contracts (SC) system 100. FIG. 2 depicts an exemplary SC computing architecture 200 that may be used to implement SC system 100. SC system 100 may include a SC computing device 102 that includes at least one database server 104. SC computing device may be implemented using SC computing architecture 200, and may further include a blockchain structure 202, a marketplace module 204, a smart contract module 206 (each shown in FIG. 2). Blockchain structure 202, marketplace module 204, and smart contract module 206 may be implemented, for example, using at least one of a processor and/or a memory device of SC computing device 102. SC system may further include a database 106, a plurality of user computing devices 108, and/or one or more information sources 110. Database 106, user computing devices 108, and/or information sources 110 may be in communication with SC computing device 102.

In one exemplary embodiment, SC computing device 102 may be configured to receive a plurality of deposits from a plurality of user computer devices 108 that correspond to a plurality of users. In some embodiments, the deposits are in the form of a cryptocurrency (e.g., Bitcoin, Ether, and/or other cryptocurrencies) and/or another electronic funds transfer protocol. The SC computing device may store the received funds in blockchain structure 202. In some embodiments, the deposit received for a given user may be stored in association with a corresponding user identifier. SC computing device 102 may further enable funds to be withdrawn and/or transferred among users.

In some embodiments, blockchain structure 202 may include a deposits tree 208 that tracks a current amount of funds associated with each user identifier. For example, deposits tree 208 may include a plurality of nodes. Each node may include each of the user identifiers corresponding to the plurality of users and the current amount of funds associated with each user. A new node may be added each time an amount of funds for a particular user identifier changes, for example, via a deposit, withdrawal, or transfer to another user identifier. For example, if a first user transfers funds to a second user, a new node may be generated, wherein the current amount of funds associated with the user identifier of the first user is reduced by the payment amount, and the current amount of funds associated with the second user is increased by the payment amount. The newly generated node may include a data feature (e.g., a cryptographic hash) linking the newly generated node, for example, to the chronologically previous node.

In some embodiments, SC computing device 102 may further enable users to withdraw funds from blockchain structure 202. For example, a user may withdraw funds after receiving a payout from a smart contract, as described below. In some embodiments, SC computing device 102 may place conditions on when a user may withdraw funds. For example, if a user has committed a certain amount of funds (e.g., an insurance coverage amount) for a period under a smart contract, as described below, the SC computing device may prevent the user from withdrawing funds if the withdrawal could cause the current amount of funds of the user to fall below the committed amount.

In one exemplary embodiment, SC computing device 102 may receive, from one of the plurality of user computing devices 108, a proposal message for a proposed smart contract between users. In some embodiments, the proposal message may be received at, for example, marketplace module 204. The proposal message may include, for example, proposed terms for the smart contract. For example, the proposed smart contract may be a decentralized insurance policy, and the proposed terms may include, for example, a price, a coverage amount, a payout condition of the coverage amount, and/or a specified data source (e.g., an information source 110). The price is an amount of funds to be paid by the buyer of the decentralized insurance policy. The coverage amount is an amount to be paid by the seller to the buyer if the payout condition occurs, for example, before a set term has expired. The specified data source may include one or more information sources 110 that are used to determine whether the payout condition has occurred. In one example, the payout condition may be that an earthquake registering above 7.4 on the Richter scale occurs in San Francisco in a given year, and the specified data source (e.g., information source 110) may be the United States Geological Survey (USGS). In another example, the payout condition may be that an air quality index reaches above hazardous levels of 301 parts per million for more than one week in San Francisco, and the specified data source may be the United States Environmental Protection Agency (EPA). In some examples, the smart contract may include any number of payout conditions, and each payout condition may have any number of specified data sources (e.g., information sources 110) that are used to verify whether the payout condition has occurred. For example, the SC computing device may compute an average value from values obtained from different information sources 110 corresponding to the same parameter.

In some embodiments, SC computing device 102 may provide a marketplace to the plurality of user computing devices 108. In some embodiments, a marketplace may be implemented using marketplace module 204. The marketplace may include an interface through which the users may, for example, deposit funds, submit proposal messages, and/or or further interact with SC computing device 102 or other user computing devices 108. For example, the marketplace may provide options (e.g., via a pull-down list and/or another virtual mechanism) for a user attempting to submit a proposal, for example, for specific payout conditions (e.g., types of insurance coverage), data sources, periods, and/or other terms of the proposed smart contract. SC computing device 102 may generate the proposal message based at least in part upon the options selected by the user via the interface. Such an interface enables users to easily and efficiently submit proposals for a smart contract, and ensures that the smart contract has well-defined and/or easily enforceable terms. SC computing device 102 may display the proposal message to other users via the interface. In some embodiments, SC computing device 102 may identify other users who are likely to accept the proposed smart contract, for example, using machine learning techniques and/or artificial intelligence (AI) techniques, and display the proposal message to the identified users (e.g., via user computing devices 108).

In the exemplary embodiment, SC computing device 102 may receive response messages from user computing devices 108, for example, to join the proposed smart contract. In some embodiments, the response messages may be received at, for example, marketplace module 204. When the proposed smart contract corresponds to a decentralized insurance policy, the response messages may include, for example at least one response message from a buyer and/or from a seller of the policy. In some examples, the user who submitted the proposal message for the smart contract may additionally be a buyer or seller with respect to the smart contract. For example, an insurance company may submit a proposal for a decentralized insurance policy and be the "seller" of the policy with respect to the proposed smart contract, and one or more buyers (e.g., potential customers) may submit the response message. In some examples, the response message may be submitted via the interface provided by SC computing device 102.

In some example embodiments, a plurality of buyers and/or a plurality of sellers may respond to a particular smart contract. For example, a decentralized insurance policy may have a coverage amount that is significantly greater than the price, making the decentralized insurance policy risky for an individual seller who may potentially have to pay the entire coverage amount. By enabling a plurality of sellers to respond, SC computing device 102 allows the obligation to pay the coverage amount if the payout condition occurs to be spread out over the plurality of sellers. In some embodiments, SC computing device 102 may identify similar or otherwise combinable proposals, for example, using machine learning techniques and/or AI techniques, and aggregate the identified proposals.

In one exemplary embodiment, SC computing device 102 may generate a smart contract in blockchain structure 202, for example, in response to receiving response messages accepting a proposed smart contract. In some embodiments, the smart contract is generated using, for example, smart contract module 206. In some embodiments, SC computing device 102 generates the smart contracts using an open-source platform (e.g., Ethereum). SC computing device 102 may store the contracts in a contract tree 210 within blockchain structure 202, which may be separate from deposits tree 208. For example, each smart contract may be a node (e.g., a "block") of contract tree 210. Each smart contract may include data (e.g., user identifiers, the coverage amount, the payout condition, the selected data source, and/or other data), other computer code for executing the smart contract, and/or one or more data features (e.g., a cryptographic hash) linking the smart contract to other nodes of contract tree 210 (e.g., a chronologically previous node).

In the exemplary embodiments, SC computing device 102 may determine whether the one or more payout conditions of a smart contract have occurred and/or otherwise has been met. SC computing device 102 may determine whether the payout condition has occurred based at least in part upon one or more information sources 110. Information sources 110 may include, for example, government or non-government organizations, news entities, and/or other entities producing publications.

In some embodiments, data from the various information sources 110 may be collected by the SC computing device and stored in database 106. In such embodiments, the data may be stored in a specific, standardized format. For example, data may be organized by source, type, time recorded and/or updated, other attributes, and/or any combination thereof. In one example, database 106 may include a plurality of data fields and a plurality of real data values associated with each data field, wherein the real data values are received from the data sources. When determining whether the payout condition for a smart contract has been met, SC computing device 102 may retrieve a corresponding real data value from database 106 to compare to a value (sometimes referred to herein as a "condition value") specified by the smart contract.

For example, in some embodiments, to determine whether the payout condition has occurred, SC computing device 102 may extract a condition value from the smart contract. For example, the condition value may include a precipitation amount at a specified location and an indicator of whether the payout condition needs that the precipitation be greater or less than the precipitation amount. SC computing device 102 may then retrieve, from the database, the real data value corresponding to the payout condition, wherein the real data value originates from an information source 110 specified by the contract. For example, SC computing device 102 may retrieve data from an information source 110 (e.g., the National Weather Service) corresponding to the actual precipitation amount at the specified location. SC computing device 102 may then compare the condition value to the real data value to determine that the payout condition has been met. For example, if the actual precipitation amount is less than the precipitation amount specified in the smart contract, the payout condition may be met, and the buyer may be entitled to receive a payout of the coverage amount. If SC computing device 102 does determine that the payout condition has occurred, SC computing device 102 may automatically transfer the coverage amount from the buyer to the seller. In some embodiments, the smart contracts stored in blockchain structure 202 may include instructions (e.g., computer code) that automatically causes SC computing device 102 to determine whether the payout condition has occurred and/or transfer funds between different users (e.g., a coverage payout to a buyer).

In some embodiments, SC computing device 102 may use multiple information source 110 to determine that a particular payout condition has occurred. Using multiple information source 110 may, for example, mitigate data corruption, data noise, and adversarial attacks against data sources. SC computing device 102 may use a mechanism and/or algorithm to combine values obtained from multiple sources of data into a single real data value that can be compared to the payout condition. In some embodiments, SC computing device 102 may determine a mode or most common value, across all sources of data. Additionally or alternatively, in some embodiments, SC computing device 102 may compute a median value. For example, SC computing device 102 may compute a median temperature at a given location and given date and time across various weather stations. In other embodiments, SC computing device 102 may utilize other algorithms that determine a single real data value from multiple source values.

In some embodiments, SC computing device 102 is used to implement a decentralized insurance system, wherein one or more specified data sources (e.g., information sources 110) are used to determine whether the coverage amount of a decentralized insurance policy should be paid, and in response, automatically transfer the payment. SC computing device 102 may receive a proposal message including proposed terms for a decentralized insurance policy from one or more of user computing devices 108. The user submitting the proposal message may be, for example, an insurance company and/or an individual user. In some embodiments, the proposal may be submitted through a marketplace interface provided by the SC computing device (e.g., using marketplace module 204). The marketplace interface may provide specific options (e.g., via a pulldown menu) of proposed terms for the decentralized insurance policy (e.g., price amounts, coverage amounts, payout conditions, data sources, term periods, and/or other terms). The received proposal message may be displayed to other users via the marketplace interface, and the other users may submit response messages (e.g., using user computing devices 108) to join the proposed insurance policy, for example, as a buyer or seller. A buyer may pay a price amount, and may receive a payout of a coverage amount if a specified payout condition occurs. A seller may receive a payment of at least a portion of the price amount paid by the buyer, and may make a payment of at least a portion of the coverage amount if the specified payout condition occurs.

Once the terms and parties of the decentralized insurance policy are determined, SC computing device 102 may generate a smart contract including information about the decentralized insurance policy and store the generated smart contract in blockchain structure 202. SC computing device 102 may retrieve information from data sources specified by the smart contract in order to determine if the payout condition for payout has been met, for example, by comparing one or more condition values specified by the smart contract to one or more real data values stored in database 106. If the payout condition has been met, SC computing device 102 may automatically transfer the coverage amount to the buyer from one or more sellers in association with the smart contract. Once the payout has been made, the buyer may withdraw the funds from the system, for example, as an electronic and/or cryptocurrency payment.

Exemplary Client Computing Devices

Figure 3:
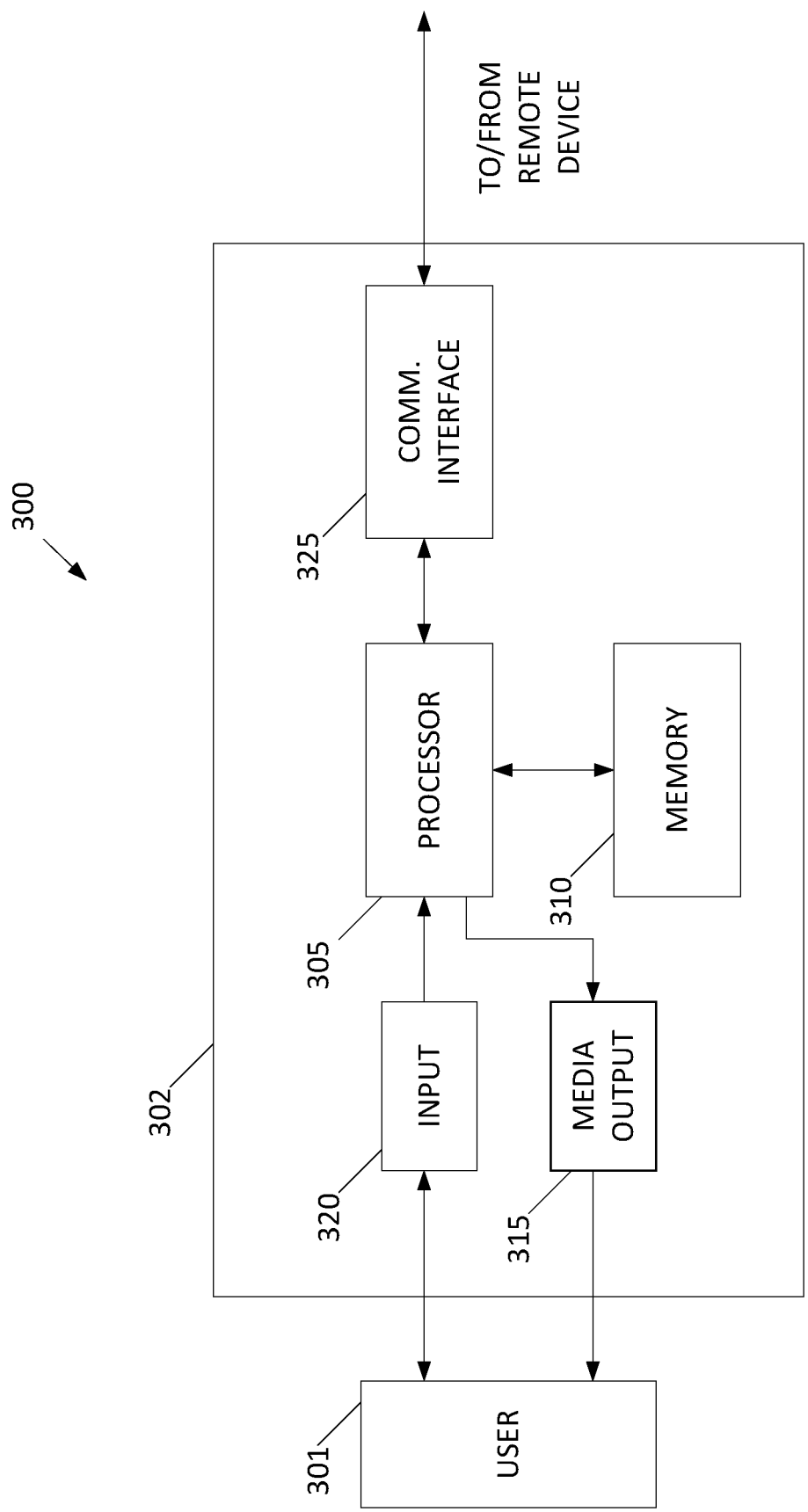
FIG. 3 depicts an exemplary client computing device that may be used with the SC system illustrated in FIG. 1.

FIG. 3 depicts an exemplary client computing device 302 (e.g., within a user environment 300). Client computing device 302 may be, for example, at least one of SC computing device 102, user computing devices 108, and/or information sources 110 (all shown in FIG. 1).

Client computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer readable media.

In exemplary embodiments, client computing device 302 may also include at least one media output component 315 for presenting information to a user 301. Media output component 315 may be any component capable of conveying information to user 301. In some embodiments, media output component 315 may include an output adapter such as a video adapter and/or an audio adapter. An output adapter may be operatively coupled to processor 305 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 302 may also include an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Client computing device 302 may also include a communication interface 325, which can be communicatively coupled to a remote device such as SC computing device 102 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 302 may also include sensors 340. Sensors 340 may include, for example, an accelerometer, a global positioning system (GPS), or a gyroscope. Sensors 340 may be used to collect data, which may be transmitted by client computing device 302 a remote device such as SC computing device 102 (shown in FIG. 1).

Stored in memory area 310 may be, for example, computer readable instructions for providing a user interface to user 301 via media output component 315 and, optionally, receiving and processing input from input device 320. A user interface may include, among other possibilities, a web browser and client application. Web browsers may enable users, such as user 301, to display and interact with media and other information typically embedded on a web page or a website. A client application may allow user 301 to interact with a server application from SC computing device 102 (shown in FIG. 1). For example, user 301 may deposit and/or withdraw funds, and/or submit proposal messages and/or response messages, as described above.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server Systems

Figure 4:
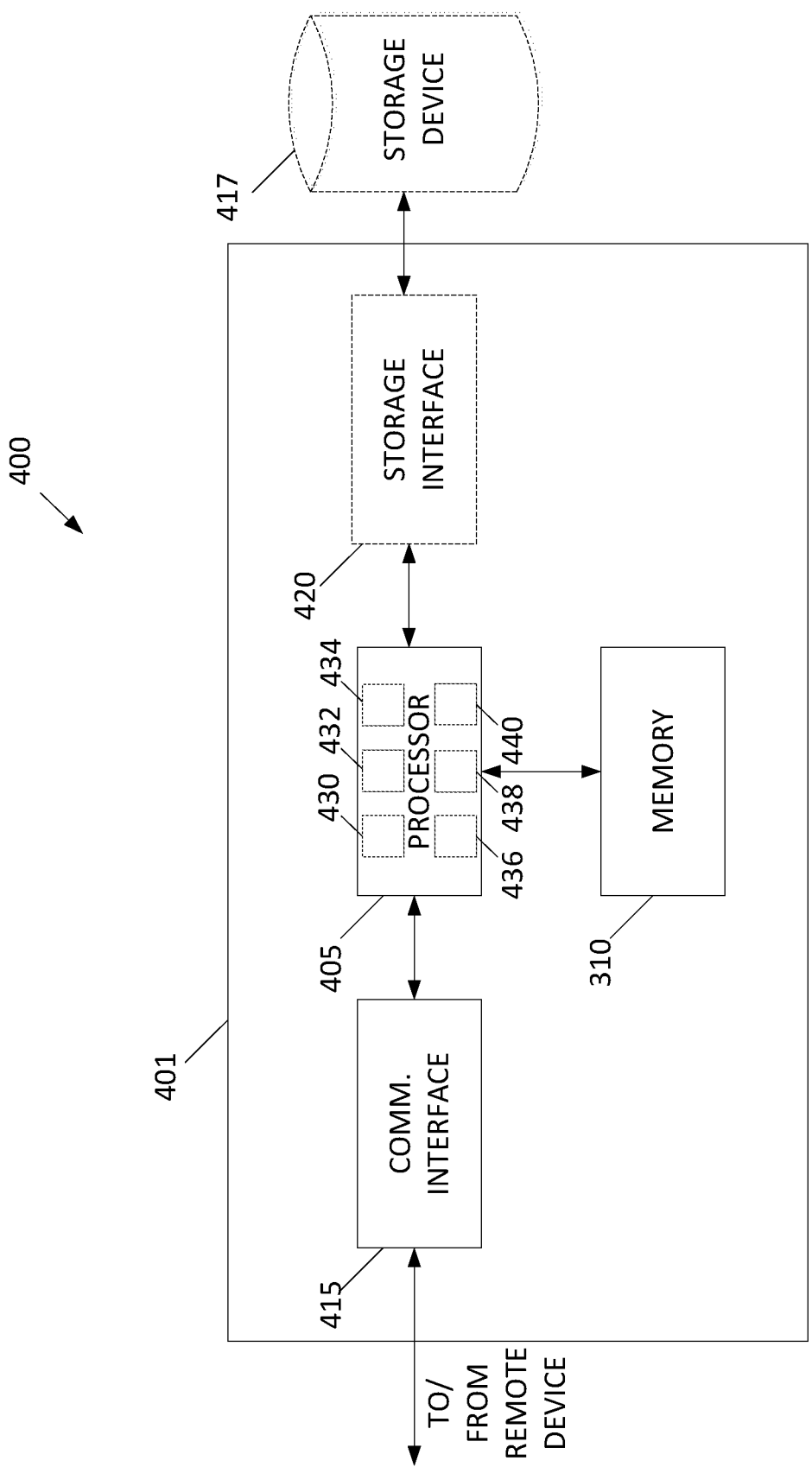
FIG. 4 depicts an exemplary server system that may be used with the SC system illustrated in FIG. 1.
Figure 5:
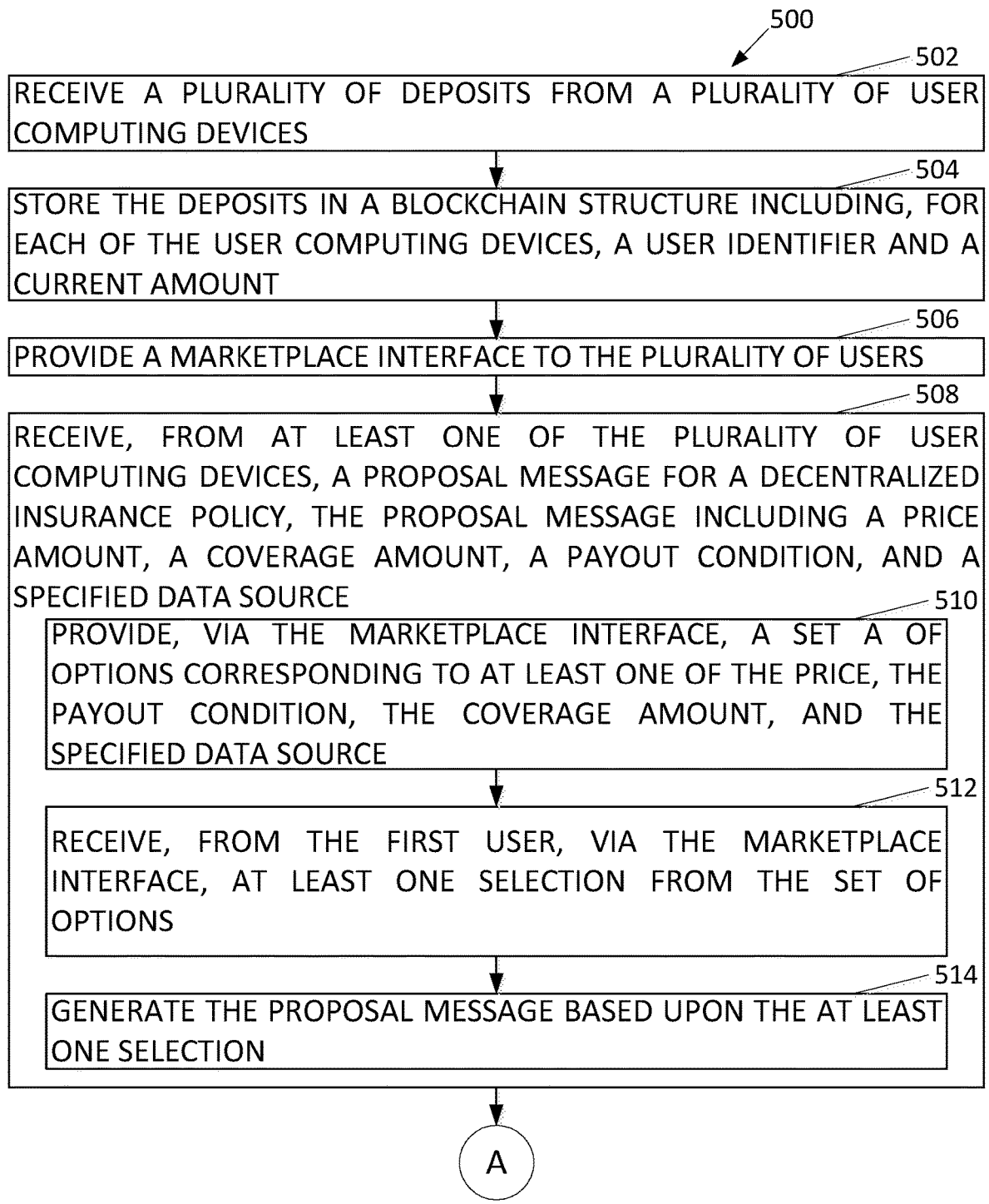
FIG. 5 illustrates an exemplary computer-implemented method for smart contracts that may be performed by the SC system illustrated in FIG. 1.
Figure 6:
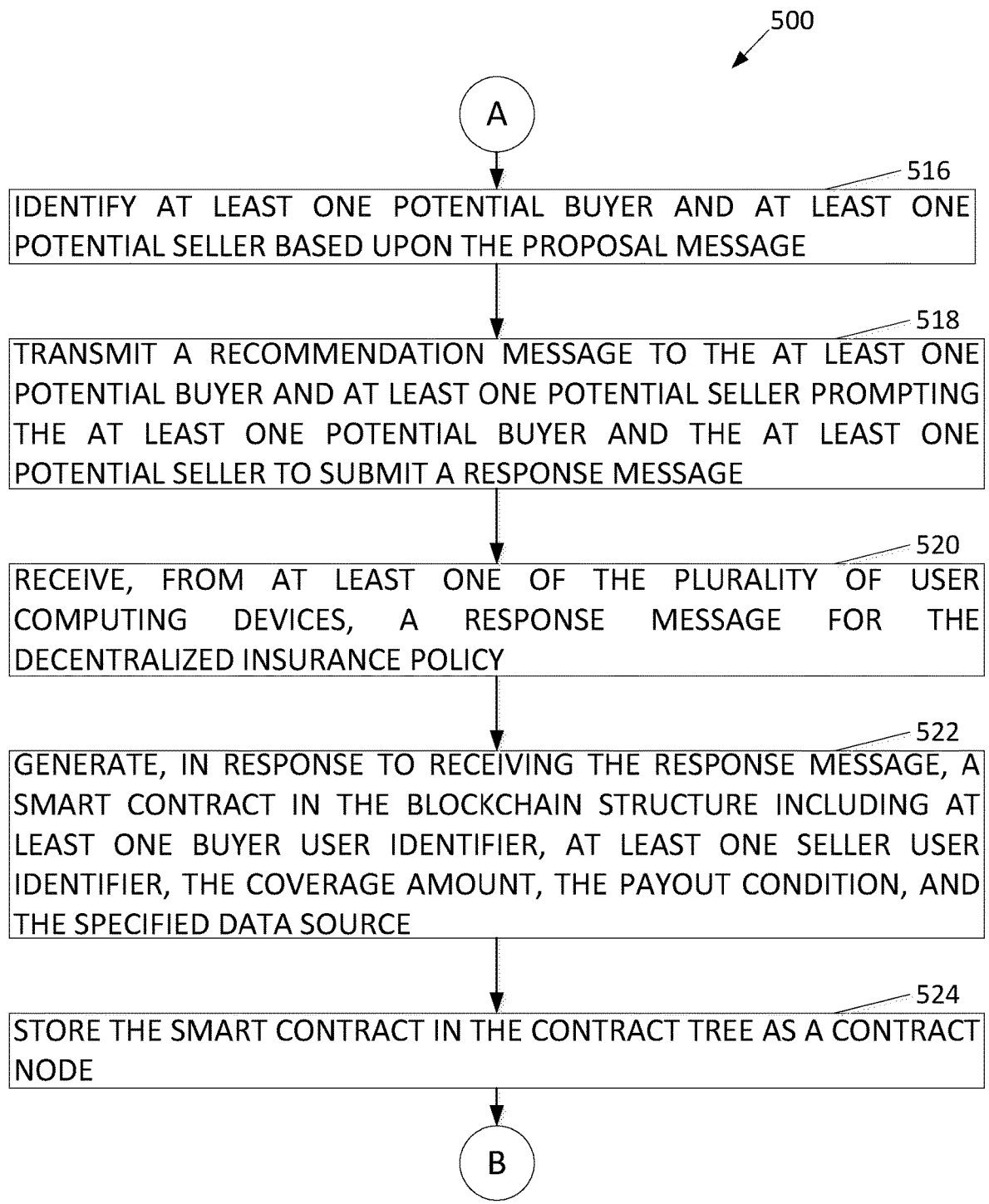
FIG. 6 is a continuation of the computer-implemented method shown in FIG. 5.
Figure 7:
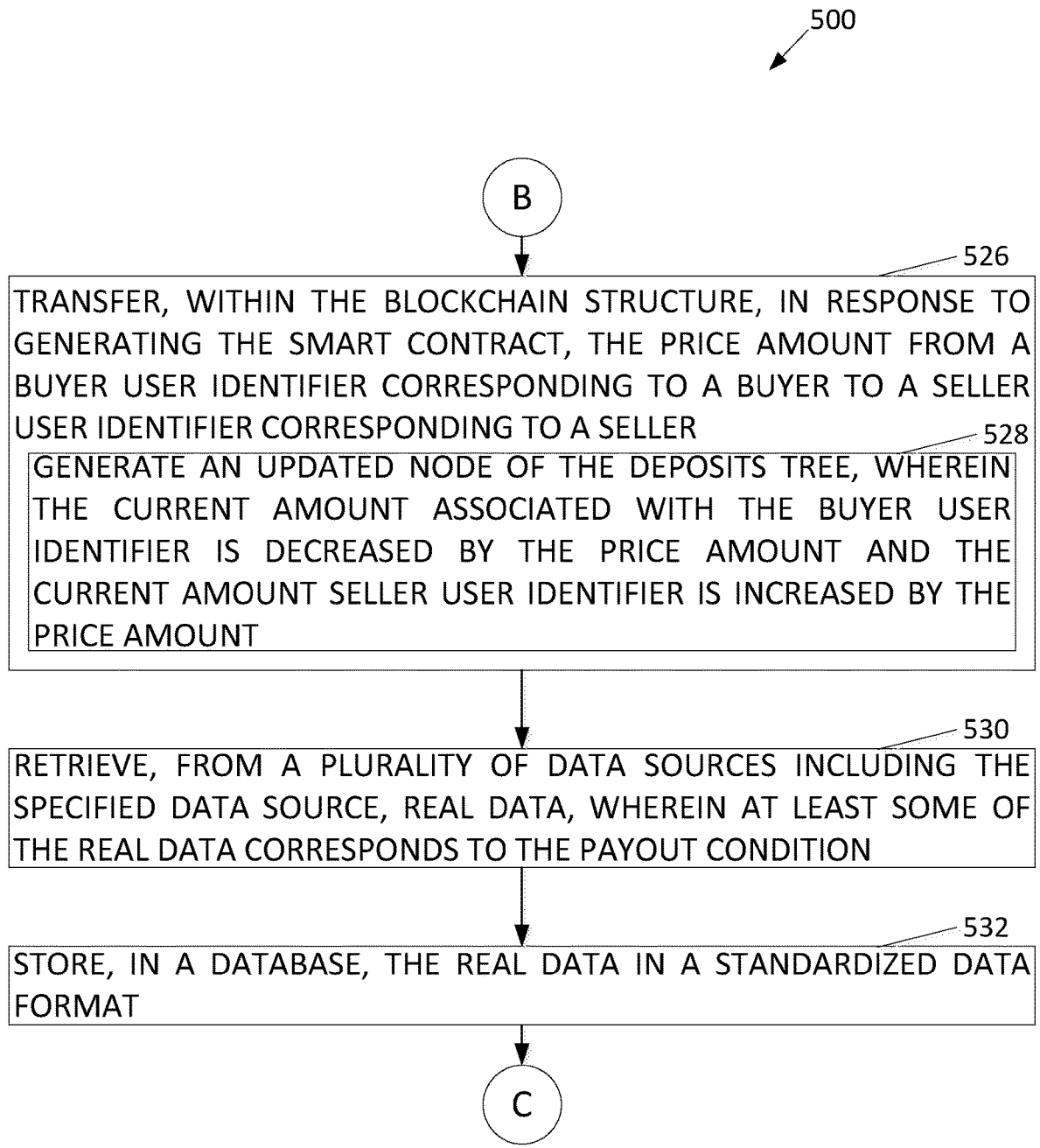
FIG. 7 is a continuation of the computer-implemented method shown in FIG. 6.
Figure 8:
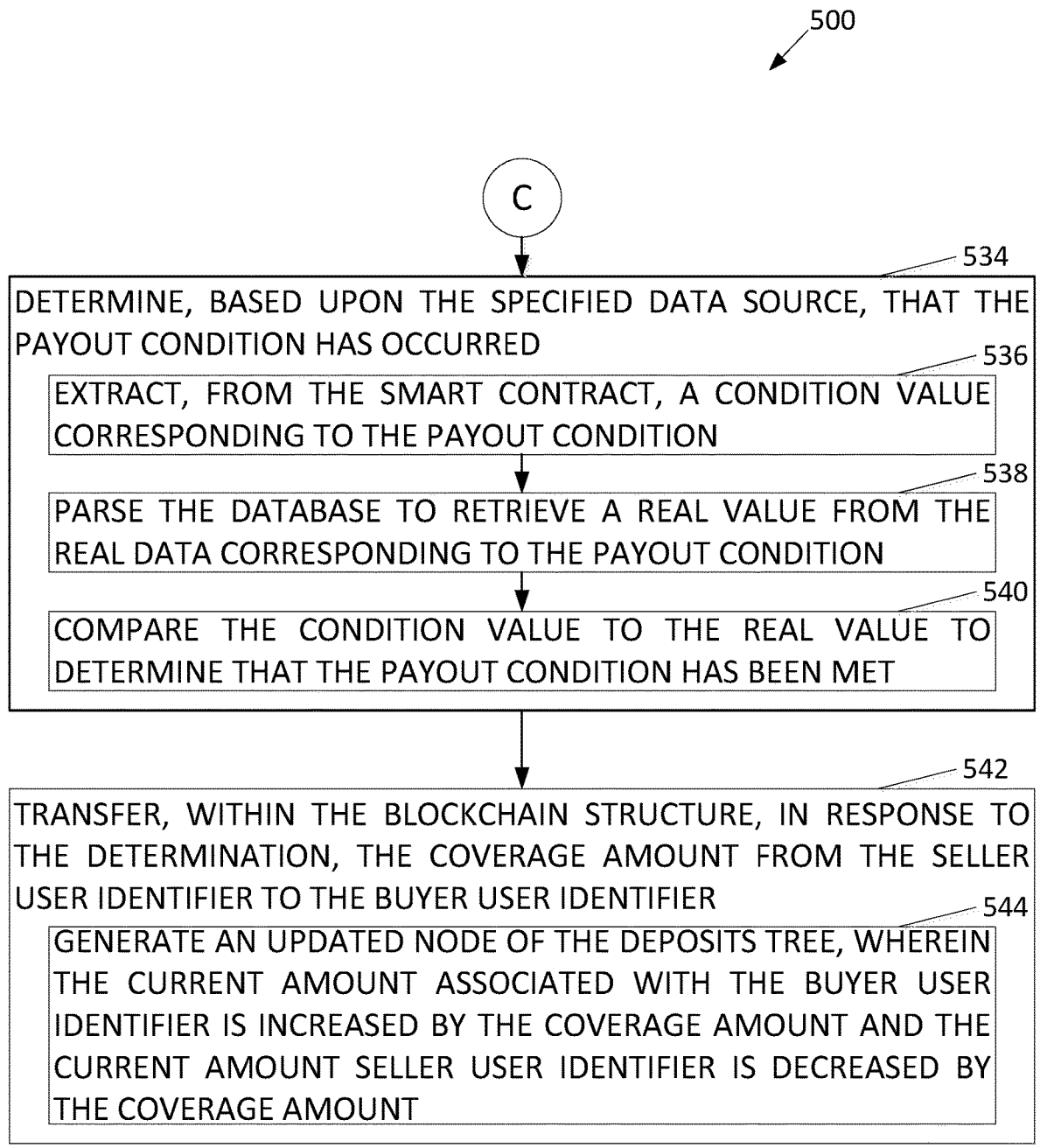
FIG. 8 is a continuation of the computer-implemented method shown in FIG. 7.

FIG. 4 depicts an exemplary server system 401 (e.g., within an environment 400) that may be used with SC system 100 illustrated in FIG. 1. Server system 401 may be, for example, SC computing device 102 (shown in FIG. 1).

In exemplary embodiments, server system 401 may include a processor 405 for executing instructions. Instructions may be stored in a memory area 410. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C#, C++, Java, or other suitable programming languages, etc.).

Processor 405 may be operatively coupled to a communication interface 415 such that server system 401 is capable of communicating with user computing devices 108, information sources 110 (all shown in FIG. 1), and/or another server system 401. For example, communication interface 415 may receive requests from user computing device 108 via the Internet.

Processor 405 may also be operatively coupled to a storage device 417, such as database 106 (shown in FIG. 1). Storage device 417 may be any computer-operated hardware suitable for storing and/or retrieving data. In some embodiments, storage device 417 may be integrated in server system 401. For example, server system 401 may include one or more hard disk drives as storage device 417.

In other embodiments, storage device 417 may be external to server system 401 and may be accessed by a plurality of server systems 401. For example, storage device 417 may include multiple storage units such as hard disks or solid state disks in a redundant array of inexpensive disks (RAID) configuration. Storage device 417 may include a storage area network (SAN) and/or a network attached storage (NAS) system.

In some embodiments, processor 405 may be operatively coupled to storage device 417 via a storage interface 420. Storage interface 420 may be any component capable of providing processor 405 with access to storage device 417. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 417.

In exemplary embodiments, processor 405 may include and/or be communicatively coupled to one or more modules for implementing the systems and methods described herein. For example, processor 405 may include one or more of a payment module 430, a marketplace module 432, a smart contract module 434, and/or a data management module 436. Other modules (438, 440) may be included in the processor. In some embodiments, marketplace module 432 may be substantially similar to marketplace module 204 (shown in FIG. 2), and smart contract module 434 may be substantially similar to smart contract module 206 (shown in FIG. 2).

In some embodiments, payment module 430 may be configured, for example, to receive a plurality of deposits from a plurality of user computing devices, to store the plurality of deposits in a blockchain structure including, for each computing device of the user computing devices, a user identifier and a current amount; to transfer, within the blockchain structure, in response to generating the smart contract, the price amount from a buyer user identifier corresponding to a buyer to a seller user identifier corresponding to a seller; to generate an updated node of the deposits tree, wherein the current amount associated with the buyer user identifier is decreased by the price amount and the current amount seller user identifier is increased by the price amount; to transfer, within the blockchain structure, in response to the determination, the coverage amount from the seller user identifier to the buyer user identifier; and/or to generate an updated node of the deposits tree, wherein the current amount associated with the buyer user identifier is increased by the coverage amount and the current amount seller user identifier is decreased by the coverage amount.

In some embodiments, marketplace module 432 may be configured, for example, to provide a marketplace interface to the plurality of users; to receive, from at least one user computing device of the plurality of user computing devices, a proposal message for a decentralized insurance policy, the proposal message including a price amount, a coverage amount, a payout condition, and a specified data source; to provide, via the marketplace interface, a set a of options corresponding to at least one of the price, the payout condition, the coverage amount, and the specified data source; to receive, from the first user, via the marketplace interface, at least one selection from the set of options; to generate the proposal based at least in part upon the at least one selection; to receive, from at least one user computing device of the plurality of user computing devices, a response message for the decentralized insurance policy; to identify at least one potential buyer and at least one potential seller based at least in part upon the proposal message; and/or to transmit a recommendation message to the at least one potential buyer and at least one potential seller prompting the at least one potential buyer and the at least one potential seller to submit the response message.

In some embodiments, smart contract module 434 may be configured, for example, to generate, in response to receiving the response message, a smart contract in the blockchain structure including at least one buyer user identifier, at least one seller user identifier, the coverage amount, the payout condition, and the specified data source; and/or to store the smart contract in the contract tree as a contract node.

In some embodiments, data management module 436 may be configured, for example, to retrieve, from a plurality of data sources including the specified data source, real data, wherein at least some of the real data corresponds to the payout condition; to store, in a database, the real data in a standardized data format; to determine, based at least in part upon the specified data source, that the payout condition has occurred; to extract, from the smart contract, a condition value corresponding to the payout condition; to parse the database to retrieve a real value from the real data corresponding to the payout condition; and/or to compare the condition value to the real value to determine that the payout condition has been met.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Methods for Determining an Insurance Premium of a Driver Identified by the VA System FIGS. 5-8 illustrate an exemplary computer-implemented method 500 for smart contracts that may be implemented using one or more components of SC system 100 (shown in FIG. 1).

Computer-implemented method 500 may include receiving 502 a plurality of deposits from a plurality of user computing devices. In some embodiments, receiving 502 the plurality of deposits may be performed by SC computing device 102 (shown in FIG. 1), for example, by executing payment module 430 (shown in FIG. 4).

Computer-implemented method 500 may further include storing 504 the deposits in a blockchain structure including, for each computing device of the user computing devices, a user identifier and a current amount. In some embodiments, storing 504 the deposits may be performed by SC computing device 102, for example, by executing payment module 430.

In some embodiments, computer-implemented method 500 may further include providing 506 a marketplace interface to the plurality of users. In some such embodiments, providing 506 the marketplace interface may be performed by SC computing device 102, for example, by executing marketplace module 432 (shown in FIG. 4).

Computer-implemented method 500 may further include receiving 508, from at least one user computing device of the plurality of user computing devices, a proposal message for a decentralized insurance policy, the proposal message including a price amount, a coverage amount, a payout condition, and a specified data source. In some embodiments, receiving 508 the proposal message may include providing 510, via the marketplace interface, a set a of options corresponding to at least one of the price, the payout condition, the coverage amount, and the specified data source, receiving 512, from the first user, via the marketplace interface, at least one selection from the set of options, and/or generating 514 the proposal based at least in part upon the at least one selection. In some embodiments, receiving 508 the proposal message may be performed by SC computing device 102, for example, by executing marketplace module 432.

In some embodiments, computer-implemented method 500 may further include identifying 516 at least one potential buyer and at least one potential seller based at least in part upon the proposal message. In such embodiments, computer-implemented method 500 may further include transmitting 518 a recommendation message to the at least one potential buyer and at least one potential seller prompting the at least one potential buyer and the at least one potential seller to submit the response message. In some such embodiments, identifying 516 the at least one potential buyer and/or transmitting 518 the recommendation message may be performed by SC computing device 102, for example, by executing marketplace module 432.

Computer-implemented method 500 may further include receiving 520, from at least one user computing device of the plurality of user computing devices, a response message for the decentralized insurance policy. In some embodiments, receiving 520 the response message may be performed by SC computing device 102, for example, by executing marketplace module 432.

Computer-implemented method 500 may further include generating 522, in response to receiving the response message, a smart contract in the blockchain structure including at least one buyer user identifier, at least one seller user identifier, the coverage amount, the payout condition, and the specified data source. In some embodiments, generating 522 the smart contract may be performed by SC computing device 102, for example, by executing smart contract module 434.

In some embodiments, computer-implemented method 500 may further include storing 524 the smart contract in the contract tree as a contract node. In some such embodiments, storing 524 the smart contract may be performed by SC computing device 102, for example, by executing smart contract module 434.

In some embodiments, computer-implemented method 500 may further include transferring 526, within the blockchain structure, in response to generating the smart contract, the price amount from a buyer user identifier corresponding to a buyer to a seller user identifier corresponding to a seller. In some such embodiments, transferring 526 the price amount may include generating 528 an updated node of the deposits tree, wherein the current amount associated with the buyer user identifier is decreased by the price amount and the current amount seller user identifier is increased by the price amount. In some such embodiments, transferring 526 the price amount may be executed by SC computing device 102, for example by executing payment module 430.

In some embodiments, computer-implemented method 500 may further include retrieving 530, from a plurality of data sources including the specified data source, real data, wherein at least some of the real data corresponds to the payout condition. In such embodiments, computer-implemented method 500 may further include storing 532, in a database, the real data in a standardized data format. In some such embodiments, retrieving 530 the real data and/or storing 532 the real data in a standardized data format may be performed by SC computing device 102, for example, by executing data management module 436 (shown in FIG. 4).

In some embodiments, computer-implemented method 500 may further include determining 534, based at least in part upon the specified data source, that the payout condition has occurred. In some such embodiments, determining 534 that the payout condition has occurred may include extracting 536, from the smart contract, a condition value corresponding to the payout condition, parsing 538 the database to retrieve a real value from the real data corresponding to the payout condition, and/or comparing 540 the condition value to the real value to determine that the payout condition has been met. In some such embodiments, determining that the payout condition has occurred may be performed by SC computing device 102, for example, by executing data management module 436.

In some embodiments, computer-implemented method 500 may further include transferring 542, within the blockchain structure, in response to the determination, the coverage amount from the seller user identifier to the buyer user identifier. In some such embodiments, transferring 542 the coverage amount may include generating 544 an updated node of the deposits tree, wherein the current amount associated with the buyer user identifier is increased by the coverage amount and the current amount seller user identifier is decreased by the coverage amount. In some such embodiments, transferring 542 the coverage amount may be performed by SC computing device 102, for example, by executing payment module 430.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), reinforced learning techniques, voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs.

As described above, the systems and methods described herein may use machine learning, for example, for pattern recognition. That is, machine learning algorithms may be used by SC computing device to attempt, for example, to identify users who are likely to accept a smart contract, and to identify similar smart contracts that may be combined. Accordingly, the systems and methods described herein may use machine learning algorithms for both pattern recognition and predictive modeling.

EXEMPLARY EMBODIMENTS

In one aspect, smart contract (SC) computing device may be provided. The SC computing device may include at least one processor in communication with at least one memory device. The at least one processor may be configured to: (1) receive a plurality of deposits from a plurality of user computing devices; (2) store the plurality of deposits in a blockchain structure including, for each computing device of the user computing devices, a user identifier and a current amount; (3) receive, from at least one user computing device of the plurality of user computing devices, a proposal message for a decentralized insurance policy, the proposal message including a price amount, a coverage amount, a payout condition, and a specified data source; (4) receive, from at least one user computing device of the plurality of user computing devices, a response message for the decentralized insurance policy; and/or (5) generate, in response to receiving the response message, a smart contract in the blockchain structure including at least one buyer user identifier, at least one seller user identifier, the coverage amount, the payout condition, and the specified data source. The SC computing device may include additional, less, or alternate functionality, including that discussed elsewhere herein.

In another aspect, a computer-implemented method for smart contracts may be provided. The computer-implemented method may be performed by a smart contract (SC) computing device including at least processor in communication with at least one memory device. The computer-implemented method may include: (1) receiving, by the SC computing device, a plurality of deposits from a plurality of user computing devices; (2) storing, by the SC computing device, the deposits in a blockchain structure including, for each computing device of the user computing devices, a user identifier and a current amount; (3) receiving, by the SC computing device, from at least one user computing device of the plurality of user computing devices, a proposal message for a decentralized insurance policy, the proposal message including a price amount, a coverage amount, a payout condition, and a specified data source; (4) receiving, by the SC computing device, from at least one user computing device of the plurality of user computing devices, a response message for the decentralized insurance policy; and/or (5) generating, by the SC computing device, in response to receiving the response message, a smart contract in the blockchain structure including at least one buyer user identifier, at least one seller user identifier, the coverage amount, the payout condition, and the specified data source. The computer-implemented method may include additional, less, or alternate actions, including those discussed elsewhere herein.

In another aspect, at least one non-transitory computer-readable media having computer-executable instructions embodied thereon may be provided. When performed by a smart contract (SC) computing device including at least one processor in communication with at least one memory device, the computer-executable instructions may cause the at least one processor to (1) receive, a plurality of deposits from a plurality of user computing devices; (2) store the plurality of deposits in a blockchain structure including, for each computing device of the user computing devices, a user identifier and a current amount; (3) receive, from at least one user computing device of the plurality of user computing devices, a proposal message for a decentralized insurance policy, the proposal message including a price amount, a coverage amount, a payout condition, and a specified data source; (4) receive, from at least one user computing device of the plurality of user computing devices, a response message for the decentralized insurance policy; and/or (5) generate, in response to receiving the response message, a smart contract in the blockchain structure including at least one buyer user identifier, at least one seller user identifier, the coverage amount, the payout condition, and the specified data source. The computer-executable instructions may direct additional, less, or alternate functionality, including that discussed elsewhere herein.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components decentralized among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

We claim:

1. A smart contract (SC) computing device comprising at least one processor in communication with at least one memory device, the at least one processor configured to:
   receive a plurality of deposits from a plurality of user computing devices;
   store the plurality of deposits in a blockchain structure including, for each computing device of the user computing devices, a user identifier and a current amount, the blockchain structure comprising a deposits tree including a plurality of nodes, each node of the plurality of nodes including a respective user identifier and a respective current amount associated with the respective user identifier;
   receive, from at least one user computing device of the plurality of user computing devices, a proposal message for a decentralized insurance policy, the proposal message including a price amount, a coverage amount, a payout condition, and a specified data source;
   receive, from at least one user computing device of the plurality of user computing devices, a response message for the decentralized insurance policy; and
   generate, in response to receiving the response message, a smart contract in the blockchain structure including at least one buyer user identifier, at least one seller user identifier, the coverage amount, the payout condition, and the specified data source.

2. The SC computing device of claim 1, wherein the at least one processor is further configured to transfer, within the blockchain structure, in response to generating the smart contract, the price amount from a buyer user identifier corresponding to a buyer to a seller user identifier corresponding to a seller.

3. The SC computing device of claim 1, wherein the at least one processor is further configured to:
   determine, based at least in part upon the specified data source, that the payout condition has occurred; and
   transfer, within the blockchain structure, in response to the determination, the coverage amount from a seller user identifier to a buyer user identifier.

4. The SC computing device of claim 3, wherein to transfer the coverage amount from the seller user identifier to the buyer user identifier, the at least one processor is configured to generate an updated node of the deposits tree, wherein a current amount associated with the buyer user identifier is increased by the coverage amount and a current amount associated with the seller user identifier is decreased by the coverage amount.

5. The SC computing device of claim 1, wherein the blockchain structure includes a contract tree separate from the deposits tree, and the at least one processor is further configured to store the smart contract in the contract tree as a contract node.

6. The SC computing device of claim 1, wherein the at least one processor is further configured to:
   retrieve, from a plurality of data sources including the specified data source, real data, wherein at least some of the real data corresponds to the payout condition; and
   store, in a database, the real data in a standardized data format.

7. The SC computing device of claim 6, wherein to determine that the payout condition has occurred, the at least one processor is configured to:
   extract, from the smart contract, a condition value corresponding to the payout condition;
   parse the database to retrieve a real value from the real data corresponding to the payout condition; and
   compare the condition value to the real value to determine that the payout condition has been met.

8. The SC computing device of claim 1, wherein the at least one processor is further configured to:
   provide a marketplace interface to the plurality of user computing devices;
   provide, via the marketplace interface, a set a of options corresponding to at least one of the price amount, the payout condition, the coverage amount, and the specified data source;
   receive, from one of the plurality of user computing devices, via the marketplace interface, at least one selection from the set of options; and
   generate the proposal message based at least in part upon the at least one selection.

9. The SC computing device of claim 8, wherein the at least one processor is further configured to:
   identify at least one potential buyer and at least one potential seller based at least in part upon the proposal message; and
   transmit a recommendation message to the at least one potential buyer and at least one potential seller prompting the at least one potential buyer and the at least one potential seller to submit the response message.

10. A computer-implemented method for smart contracts performed by a smart contract (SC) computing device including at least processor in communication with at least one memory device, the computer-implemented method comprising:
   receiving, by the SC computing device, a plurality of deposits from a plurality of user computing devices;
   storing, by the SC computing device, the plurality of deposits in a blockchain structure including, for each computing device of the user computing devices, a user identifier and a current amount, the blockchain structure comprising a deposits tree including a plurality of nodes, each node of the plurality of nodes including a respective user identifier and a respective current amount associated with the respective user identifier;
   receiving, by the SC computing device, from at least one user computing device of the plurality of user computing devices, a proposal message for a decentralized insurance policy, the proposal message including a price amount, a coverage amount, a payout condition, and a specified data source;
   receiving, by the SC computing device, from at least one user computing device of the plurality of user computing devices, a response message for the decentralized insurance policy; and
   generating, by the SC computing device, in response to receiving the response message, a smart contract in the blockchain structure including at least one buyer user identifier, at least one seller user identifier, the coverage amount, the payout condition, and the specified data source.

11. The computer-implemented method of claim 10, further comprising transferring, by the SC computing device, within the blockchain structure, in response to generating the smart contract, the price amount from a buyer user identifier corresponding to a buyer to a seller user identifier corresponding to a seller.

12. The computer-implemented method of claim 10, further comprising:
   determining, by the SC computing device, based at least in part upon the specified data source, that the payout condition has occurred; and
   transferring, by the SC computing device, within the blockchain structure, in response to the determination, the coverage amount from a seller user identifier to a buyer user identifier.

13. The computer-implemented method of claim 12, wherein transferring the coverage amount from the seller user identifier to the buyer user identifier comprises generating, by the SC computing device, an updated node of the deposits tree, wherein a current amount associated with the buyer user identifier is increased by the coverage amount and a current amount associated with the seller user identifier is decreased by the coverage amount.

14. The computer-implemented method of claim 10, wherein the blockchain structure includes a contract tree separate from the deposits tree, and the computer-implemented method further comprises storing, by the SC computing device the smart contract in the contract tree as a contract node.

15. The computer-implemented method of claim 10, further comprising
   retrieving, by the SC computing device, from a plurality of data sources including the specified data source, real data, wherein at least some of the real data corresponds to the payout condition; and
   storing, by the SC computing device, in a database, the real data in a standardized data format.

16. The computer-implemented method of claim 15, determining that the payout condition has occurred comprises:
   extracting, by the SC computing device, from the smart contract, a condition value corresponding to the payout condition;
   parsing, by the SC computing device, the database to retrieve a real value from the real data corresponding to the payout condition; and
   comparing, by the SC computing device, the condition value to the real value to determine that the payout condition has been met.

17. The computer-implemented method of claim 10, further comprising:
   providing, by the SC computing device, a marketplace interface to the plurality of user computing devices;
   providing, by the SC computing device, via the marketplace interface, a set of options corresponding to at least one of the price amount, the payout condition, the coverage amount, and the specified data source;
   receiving, by the SC computing device, from one of the plurality of user computing devices, via the marketplace interface, at least one selection from the set of options; and generating, by the SC computing device, the proposal message based at least in part upon the at least one selection.

18. At least one non-transitory computer-readable media having computer-executable instructions embodied thereon, wherein when performed by a smart contract (SC) computing device including at least one processor in communication with at least one memory device, the computer-executable instructions cause the at least one processor to:

receive a plurality of deposits from a plurality of user computing devices;

store the plurality of deposits in a blockchain structure including, for each computing device of the user computing devices, a user identifier and a current amount, the blockchain structure comprising a deposits tree including a plurality of nodes, each node of the plurality of nodes including a respective user identifier and a respective current amount associated with the respective user identifier;

receive, from at least one user computing device of the plurality of user computing devices, a proposal message for a decentralized insurance policy, the proposal message including a price amount, a coverage amount, a payout condition, and a specified data source;

receive, from at least one user computing device of the plurality of user computing devices, a response message for the decentralized insurance policy; and generate, in response to receiving the response message, a smart contract in the blockchain structure including at least one buyer user identifier, at least one seller user identifier, the coverage amount, the payout condition, and the specified data source.

* * * * *